M. J. OWENS.
SHEET GLASS FORMING APPARATUS.
APPLICATION FILED JUNE 27, 1917.
1,397,326.
Patented Nov. 15, 1921.
3 SHEETS—SHEET 1.
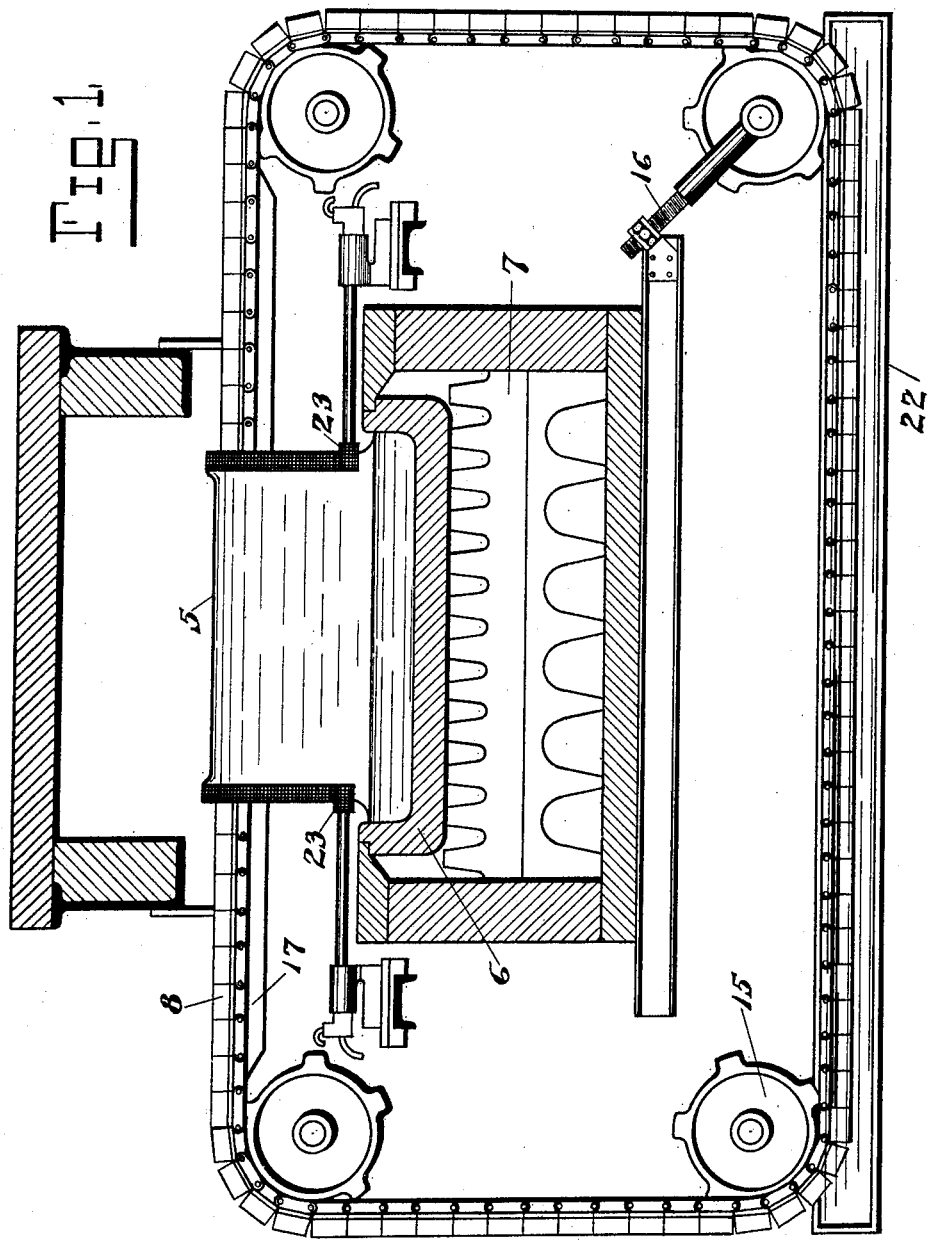
INVENTOR
Michael J. Owens,
By J. F. Rule,
His attorney.

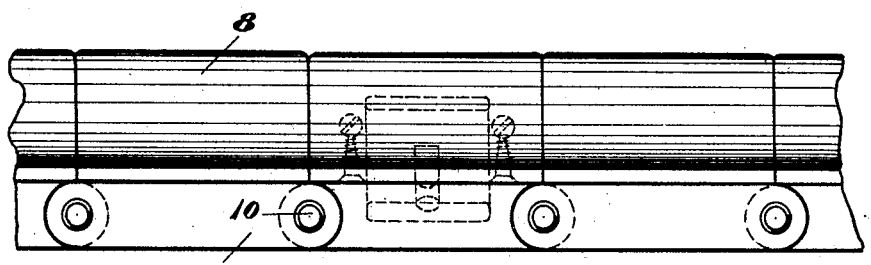
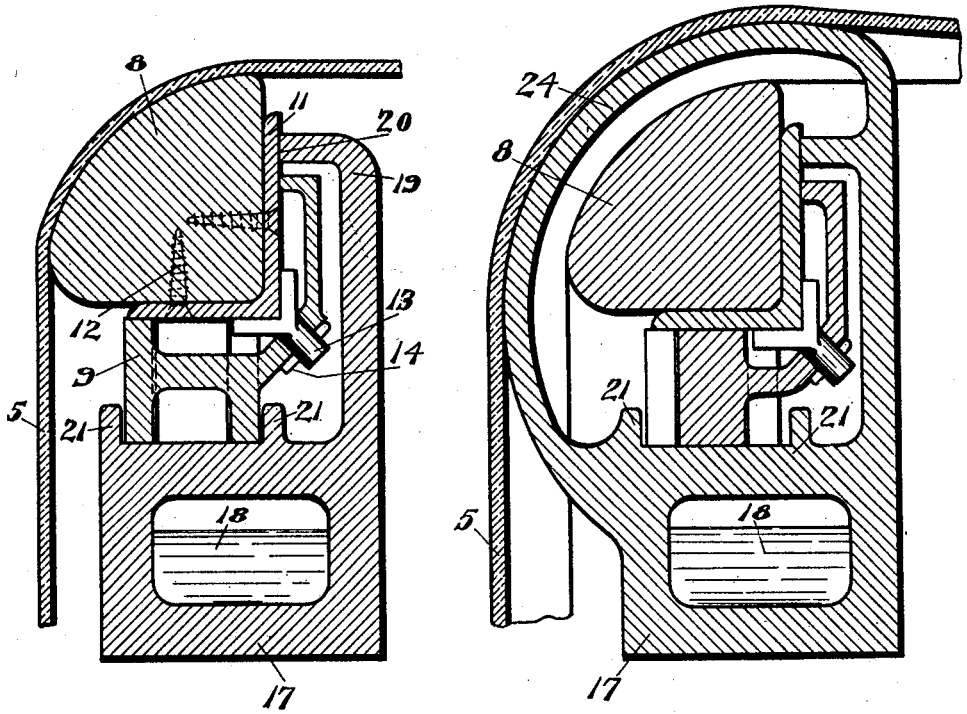

M. J. OWENS.
SHEET GLASS FORMING APPARATUS.
APPLICATION FILED JUNE 27, 1917.

1,397,326.

Patented Nov. 15, 1921.

INVENTOR
Michael J. Owens,
By J. F. Rule
His attorney.

UNITED STATES PATENT OFFICE.

MICHAEL J. OWENS, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS-FORMING APPARATUS.

1,397,326. Specification of Letters Patent. Patented Nov. 15, 1921.

Application filed June 27, 1917. Serial No. 177,181.

*To all whom it may concern:*

Be it known that I, MICHAEL J. OWENS, a citizen of the United States, residing at Toledo, in the county of Lucas and State of Ohio, have invented new and useful Improvements in Sheet-Glass-Forming Apparatus, of which the following is a specification.

My invention relates to apparatus employed in the manufacture of sheet glass by the method which consists in drawing a sheet of glass upwardly from a pot of molten glass and bending the sheet to a horizontal direction in which it is advanced through an annealing oven. It is customary in such apparatus to employ a metal bending roll over which the sheet of glass runs to change its direction. This roll which must be run at the same surface speed as the glass passing thereover, always has a more or less injurious effect on the surface of the glass, which is at this time soft and plastic, so that the surface of the glass is dulled by the roll and also takes the impress of any roughness or irregularity in the surface of the roll.

When a sheet of glass is drawn from the molten mass, the surface is cooled by the air so that a glaze is formed which is as perfect as any that could be produced by polishing or other artificial means. The sheet of glass, however, is soft and plastic until it has been drawn a considerable distance from the source of supply. It thus becomes necessary to provide a support over which the glass is drawn, and which must be positioned to engage the glass where it is still soft and susceptible to any impression. It has been found in practice that the surface of the glass is marred by such support. Ordinarily the support has consisted of metal rolls to withstand the great heat to which they are subjected. These rolls must be run at the surface speed of the glass, so that the latter takes on the impress of the rolls, thus marring the glaze.

An object of the present invention is to provide means to support the glass as it is drawn, without injuring the glaze. When the invention is embodied in apparatus for drawing the glass upwardly and then deflecting it to a horizontal direction, it provides bending means which will not mar the glass. For this purpose I employ a bending device having a sliding movement along the surface of the glass, the surface of the bending device in contact with the glass consisting of wood or an equivalent material which may be run in contact with glass while the latter is soft and plastic without marring or injuring the surface of the glass. Such material, however, would be quickly destroyed by the heat from the glass unless some special provision were made for keeping it cool. My invention overcomes this difficulty by providing means to maintain the bending device at the required low temperature.

For the purposes of my invention, the bending means may comprise a series of wooden blocks extending transversely beneath the sheet of glass and presenting a curved surface over which the glass is drawn and bent or guided to change its direction from a vertical to a horizontal direction. Said blocks are flexibly connected in the form of an endless chain running over suitable driving and guiding sprockets so that said chain of blocks may be continuously driven in a direction transverse to that of the glass. The chain of blocks may extend beneath the pot from which the glass is drawn, and passes through a trough containing water, by which the blocks are kept cool and wet.

Other features of the invention will appear hereinafter.

The present application supersedes applicant's abandoned application Serial Number 165,318, filed April 30, 1917.

In the accompanying drawings, Figure 1 is a sectional elevation of an apparatus embodying the principles of my invention.

Fig. 2 is a fragmentary view of the chain of blocks.

Fig. 3 is a sectional view on an enlarged scale through one of the bending blocks and its support.

Fig. 4 is a similar view taken at the edge of the sheet of glass and showing the means by which the roughened margin of the sheet is prevented from coming in contact with and wearing the bending block.

Figure 5:
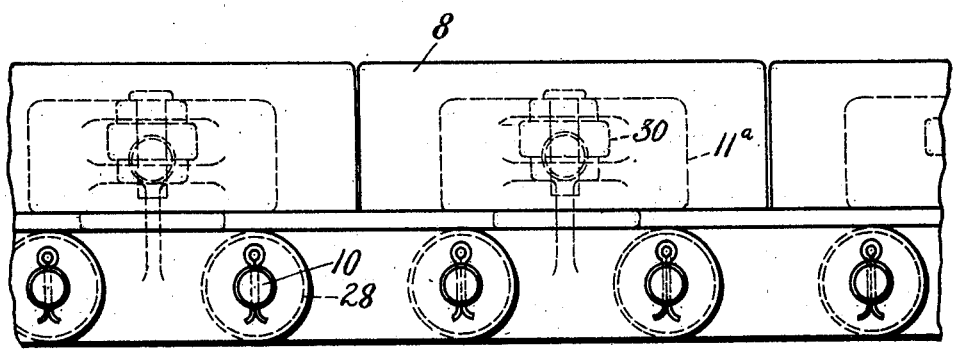
Figs. 5 and 6 are views similar to Figs. 2 and 4, of a modification.

The glass may be drawn in a continuous sheet 5 from the pot 6 containing molten glass supplied thereto from the melting or refining tank in the usual manner. A fire chamber 7 may be provided beneath the pot 6 for maintaining the glass therein at the required temperature.

Heretofore it has been customary to employ a metal bending roll over which the sheet of glass is drawn and bent to a horizontal direction. In the present invention such bending roll is replaced by a bending device comprising a series of blocks 8 made of wood or other equivalent material capable of sliding movement in contact with the surface of the soft glass without injuring such surface. These blocks are quadrant shaped as shown in Figs. 2 and 3, providing a curved surface over which the sheet of glass 5 is drawn and its direction thereby changed. The blocks 8 are carried by an endless chain comprising links 9 connected by pivots 10. The blocks 8 are connected with the chain by means of angle brackets 11 attached to the blocks by wood screws 12. Each angle iron or bracket 11 carries a stem 13 welded or otherwise secured to the bracket. The stem 13 extends through an opening in the link 9 and is secured by a cotter pin 14. It will be seen that with this construction the individual blocks may be readily removed and replaced by new blocks while the apparatus is in operation, as the cotter pins 14 and stems 13 of the vertical and lower horizontal portion of the chain are easily accessible.

The endless chain carrying the blocks 8 runs on sprocket wheels 15, one or more of which may serve as driving sprockets by which the chain is driven continuously so that the blocks 8, over which the sheet of glass is bent, slide along the under surface of the glass. A tension device 16 for taking up slack in the chain, may be provided in connection with one of the sprocket wheels. A support 17 preferably in the form of a hollow metal bar, extends transversely beneath the sheet of glass in position to support the chain and blocks as they pass beneath the sheet. Water or other cooling liquid 18 may be circulated through the support to prevent overheating. The support 17 is formed with a vertically extended plate 19 having its upper portion projected forwardly to provide a bearing surface 20, forming a backing for the brackets 11. Said support is also provided with ribs 21 extending lengthwise thereof to form a guideway for the links 9.

The lower horizontal lead of the endless chain runs in a trough 22 in which water is circulated for cooling the blocks 8. It will be seen that by this arrangement the blocks are also kept wet so that as they pass beneath the hot glass the moisture is turned into steam and thus forms a thin film or cushion of steam between the blocks and the glass. The friction between the glass and bending blocks is thus materially reduced and any tendency of the blocks to mar or injure the surface of the hot glass is also thereby reduced or eliminated.

As the sheet of glass is drawn upward from the pot 6 the edges thereof are fed between knurled rollers 23. The margins of the sheet are thus roughened. In order to prevent these roughened edges from wearing the bending blocks and also to prevent said blocks from catching on the edge of the glass, the support 17 is provided at each of said margins with a loop or arch 24 (Fig. 4) providing a guiding surface which protrudes a short distance beyond the line of the bending blocks 8. The margins of the glass sheet running on this surface are bent outwardly and held clear of said blocks so that the latter do not come in contact with said roughened margins.

Although the bending blocks are herein shown as made of wood, it will be understood that other materials may be used, as for example, a metal support or base surfaced with a paste material such as is commonly employed in so called paste molds in which glass ware is polished by running in contact with the paste lining of the mold. Such material as employed in the present invention provides a bending surface that does not injure the surface of the glass. Said bending surface may also polish the glass.

Figure 6:
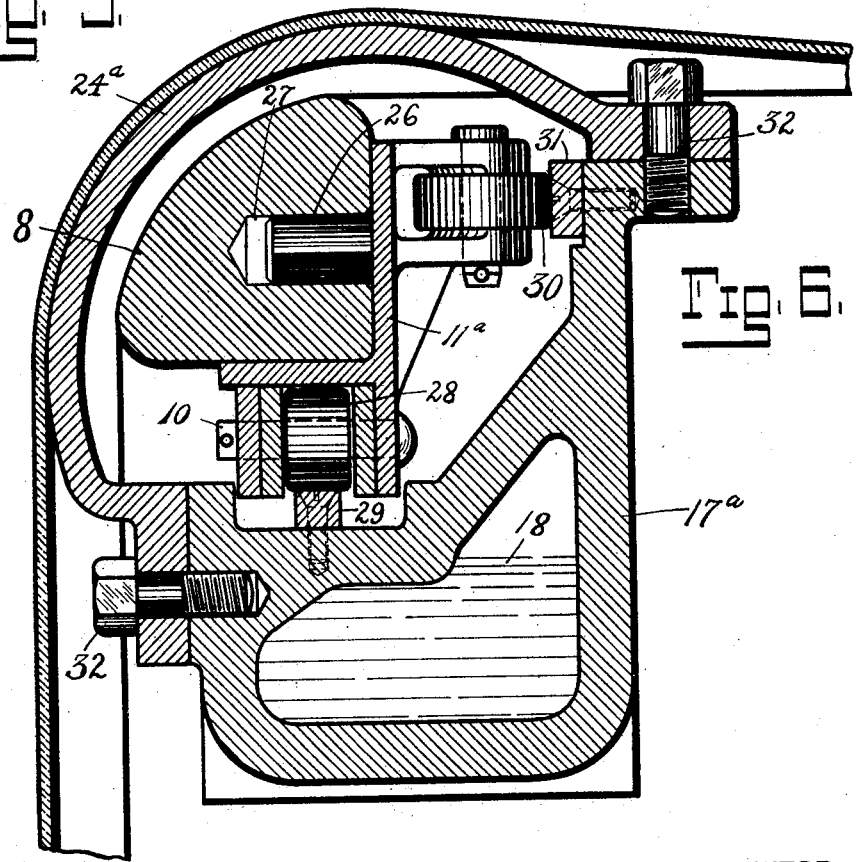

Figs. 5 and 6 show a modified construction embodying certain practical advantages over that shown in Figs. 2 and 4. As shown in Fig. 6 the bending blocks 8 are held in position on the brackets 11$^a$ by means of pins 26 integral with the brackets and fitting loosely in holes 27 bored in said blocks. Preferably a single holding pin 26 is used for each bending block. The individual blocks may be thus instantaneously removed and replaced by new blocks while the device is in operation. Anti-friction rolls 28 mounted on the pivots 10 of the chain run on a track 29 removably attached by screws to the support 17$^a$. Anti-friction rolls 30 mounted on the brackets 11$^a$ run on a track 31 also attached to the support 17$^a$. There is a considerable tension on the sheet of glass as it is drawn over the bending blocks which causes a heavy downward and lateral pressure of the bending device against the support 17$^a$. The frictional resistance which is thereby offered to the travel of the bending device is reduced to a minimum by the use of the rolls 28 and 30. The arches 24$^a$ which are preferably made of different material or metal from the support 17$^a$, are removably secured to the latter by bolts 32.

I wish not to be limited to the exact constructions herein shown, as various modifications may be resorted to without departing from the spirit and scope of my invention.

What I claim is:—

1. The combination with means for drawing a sheet of glass from a tank of molten glass, of a direction changing device having a convexly curved surface over which the sheet is drawn and by which the direction of the sheet is changed while the glass is soft and plastic, said surface consisting of a material permitting relative sliding movement of the said surface and the surface of the glass in contact therewith while the glass is in said soft, plastic condition, and means to move said device transversely of the sheet while the glass is in contact therewith.

2. In sheet glass forming apparatus, the combination with means for drawing a sheet of glass from a supply of molten glass, of a direction changing device over which the sheet of glass passes, means for driving said device and causing movement of its glass engaging surface at a different surface speed from that of the glass, and a bath of cooling liquid in which said device runs.

3. In sheet glass forming apparatus, the combination with means for drawing a sheet of glass from a supply of molten glass, a bending device providing a convex surface over which the sheet is drawn and by which its direction is changed, means to drive said device and cause a sliding movement of said surface while in contact with the glass, a pan to contain water in which said device runs, and means for maintaining a continuous circulation of water in said pan.

4. In sheet glass forming apparatus, the combination with means for forming a sheet of glass from a supply of molten glass, of a direction changing device over which the sheet passes and by which its direction of travel is changed, and means for moving said device transversely to the direction of travel of the glass as the latter passes thereover.

5. The combination with means for drawing a sheet of glass from a pool of molten glass, of a direction changing device having a curved surface over which the sheet is drawn and by which its direction is changed while the glass is soft and plastic, said surface consisting of a material permitting relative sliding movement of said surface and the surface of the glass in contact therewith while the glass is in said soft, plastic condition without marring the surface of the glass, and means for moving said device transversely to the sheet of glass as the latter passes thereover.

6. The combination with means for drawing a sheet of glass upwardly from a pool of molten glass, of a direction changing device having a curved surface over which the sheet is drawn and by which its direction of travel is changed, said device being made in sections connected to form an endless chain, and means to drive said chain and thereby cause said bending device to travel transversely to the direction of travel of the glass.

7. The combination with means for drawing a sheet of glass upwardly from a pool of molten glass, of a direction changing device having a curved surface over which the sheet is drawn and by which its direction of travel is changed, said device being made in sections connected to form an endless chain, means to drive said chain, the surfaces of said sections which come in contact with the glass, consisting of wood, and means for wetting said surfaces during their travel out of contact with the glass.

8. In sheet glass forming apparatus, the combination with means for drawing a sheet of glass from a pool of molten glass, of bending means over which the sheet is drawn and by which its direction is changed, said bending means comprising a series of wooden blocks connected to form an endless chain, means to drive said chain and cause the blocks to travel transversely to the sheet while in contact therewith, and a water trough to contain water through which the blocks pass.

9. In sheet glass forming apparatus, the combination with means for drawing a sheet of glass from a pool of molten glass, of bending means over which the sheet is drawn and by which its direction is changed, said bending means comprising a series of wooden blocks connected to form an endless chain, means to drive said chain and cause the blocks to travel transversely to the sheet while in contact therewith, a water trough to contain water through which the blocks pass, and a stationary support extending transversely beneath the sheet of glass and forming a support on which said blocks travel while in contact with the glass.

10. In sheet glass forming apparatus, the combination with means for drawing a sheet of glass from a pool of molten glass, of bending means over which the sheet is drawn and by which its direction is changed, said bending means comprising a series of wooden blocks connected to form an endless chain, means to drive said chain and cause the blocks to travel transversely to the sheet while in contact therewith, and means to hold the margins of the sheet out of contact with the bending means.

11. In sheet glass forming apparatus, the combination with a pot or receptacle to contain molten glass, of means for drawing a sheet of glass from said receptacle, comprising knurled rolls between which the margins of the sheet are drawn and by which said margins are roughened, a bending device over which the sheet is drawn and by which its direction of travel is changed, and means for deflecting said margins outwardly to clear said bending device.

12. In sheet glass forming apparatus, a sheet bending device comprising a series of bending blocks, said blocks connected to form a chain, said blocks having curved surfaces arranged to be brought into alinement and provide a bending surface over which a sheet of glass may be bent while soft and plastic, the axis of curvature of said surfaces extending lengthwise of the chain.

13. In sheet glass forming apparatus, a bending device comprising an endless chain, bending blocks secured to the links of the chain and having curved surfaces, the axis of curvature extending lengthwise of the chain, said surfaces formed of a material which may be moved along the surface of a sheet of hot, plastic glass in contact therewith without injuring the glass.

14. In sheet glass forming apparatus, the combination of an endless chain, wooden bending blocks, brackets to which said blocks are secured and pin and socket connections for detachably connecting the individual blocks to the respective links of the chain, permitting any block to be readily removed or replaced by a new block while said chain is being driven.

15. The combination with means to draw a sheet of glass of a device having a curved surface over which the glass is drawn while in a soft, plastic condition, said surface consisting of a material permitting relative sliding movement of said surface and the surface of the glass in contact therewith while the glass is in said condition, means for moving said device transversely to the direction of travel of the glass as the latter is drawn thereover, and means to prevent overheating of said device.

16. In apparatus for making sheet glass, a device over which a sheet of glass is adapted to be drawn and by which the direction of movement of the sheet is changed, said device formed in sections, means to actuate said device to intermittently withdraw the individual sections from the glass while the device is in use, and means whereby any section while thus withdrawn may be removed and replaced by a new section.

17. In apparatus for making sheet glass, the combination of direction changing means over which a sheet of glass may be drawn and its direction changed, said means comprising a series of bearing blocks over which the glass slides, a support on which said blocks are carried, means for moving said support transversely to the sheet of glass to withdraw the individual blocks from engagement with the glass, and means for detachably connecting the blocks with their support permitting any individual block to be removed and replaced by a new block while said apparatus is in operation.

18. In a sheet glass drawing apparatus, a receptacle for molten metal, a sheet drawing means, and an intermediate sheet bending device having a non-glaze destroying face running in contact with the glass at a point distant from the point of formation, the surface of the glass being free from contact with any solid substance until a surface glaze has formed thereon, the movement of said face being different from that of the glass in contact therewith.

19. In a sheet glass drawing apparatus, a receptacle for molten glass, a sheet drawing means, an intermediate sheet bending device having a fibrous contact face, and means for causing a traveling movement of the face of said bending device transversely to that of the traveling surface of the drawn sheet in contact therewith.

20. In sheet glass forming apparatus, the combination with a receptacle to contain molten glass, of means for drawing a sheet of glass from said receptacle comprising knurled or roughened rolls between which the margins of the sheet are drawn and by which said margins are roughened, a bending device over which the sheet is drawn and by which its direction of travel is changed, and means to prevent said margins from abrading the bending device.

21. The method of forming a sheet of glass consisting in drawing a sheet from a molten mass, the sheet remaining out of contact with any surface until cooling has formed a surface glaze on the sheet, then bending it during the drawing operation over a surface which is moving relatively to the drawn sheet so that said surface has a sliding contact with the glass.

22. The method of producing sheet glass which consists in drawing the glass vertically upward in a sheet from a supply of molten glass, the sheet being in contact only with the surrounding air until a surface glaze has formed thereon, then bending the sheet over a convex bending surface to change its direction, and causing a sliding movement of the bending surface along the surface of the glass as the sheet moves over the bending surface.

23. The method of forming sheet glass, which consists in drawing the glass upward in the form of a sheet from a supply of molten glass, the drawing power being applied in a horizontal direction, changing the direction in which the sheet is moved by passing it over a convexly curved bending surface while hot and plastic, causing a sliding movement of said bending surface along the surface of the glass, and interposing a fluid film between the glass and the bending surface.

24. In sheet glass forming apparatus, the combination with means for drawing a sheet of glass from a supply of molten glass, of a direction changing device having a convexly curved surface over which the sheet of glass passes, said device being located a substantial distance beyond the supply of glass and between said supply and the point at which the drawing power is applied, means to cause a sliding movement of said device transversely of the sheet, and means to maintain a fluid film between the opposing surface of said device and the glass.

25. In sheet glass forming apparatus, the combination of means for drawing a sheet of glass from a supply of molten glass, and a support between the supply and drawing means to support and guide the sheet, said support positioned to engage the glass after a glaze has formed on its surface, the glass being free from supporting contact during its passage to said support, the support having a sliding movement over the surface of the glass, and consisting of a material that will not mar said surface.

Signed at Toledo, in the county of Lucas and State of Ohio, this 21st day of June, 1917.

MICHAEL J. OWENS.